(12) United States Patent
Bacarella et al.

(10) Patent No.: US 7,528,355 B2
(45) Date of Patent: May 5, 2009

(54) SYSTEM AND METHOD FOR PROCESSING AND DISPLAYING LIGHT ENERGY

(75) Inventors: Antonio V. Bacarella, Dallas, TX (US); Timothy Everett Ostromek, Richardson, TX (US); Joseph P. Estrera, Dallas, TX (US); David W. Davis, Little Rock, AR (US)

(73) Assignee: Litton Systems, Inc., Woodland Hills, CA (US)

( * ) Notice: Subject to any disclaimer, the term of this patent is extended or adjusted under 35 U.S.C. 154(b) by 8 days.

(21) Appl. No.: 11/829,770

(22) Filed: Jul. 27, 2007

(65) Prior Publication Data

US 2007/0267566 A1   Nov. 22, 2007

Related U.S. Application Data

(63) Continuation-in-part of application No. 10/636,940, filed on Aug. 6, 2003.

(51) Int. Cl.
*H01L 27/00* (2006.01)
*G06M 7/00* (2006.01)
*G02B 27/22* (2006.01)
*H04N 9/47* (2006.01)

(52) U.S. Cl. .................... 250/208.1; 250/221; 359/462; 348/54

(58) Field of Classification Search ............ 250/208.1, 250/221, 208.2, 222.1; 359/462, 464, 630; 349/167; 345/84, 205–207, 214; 348/54, 348/55
See application file for complete search history.

(56) References Cited

U.S. PATENT DOCUMENTS

| | | | |
|---|---|---|---|
| 4,227,209 A | 10/1980 | Warner | |
| 4,234,790 A | 11/1980 | deMey, II et al. | |
| 4,473,746 A * | 9/1984 | Edmonds | 250/216 |
| 5,227,886 A | 7/1993 | Efron et al. | |
| 5,331,149 A * | 7/1994 | Spitzer et al. | 250/221 |
| 5,880,777 A | 3/1999 | Savoye et al. | |
| 6,108,130 A * | 8/2000 | Raj | 359/462 |
| 6,263,095 B1 | 7/2001 | Rushbrooke et al. | |
| 6,765,617 B1 | 7/2004 | Tangen et al. | |
| 7,034,868 B2 | 4/2006 | Sasaki et al. | |
| 7,173,658 B2 | 2/2007 | Kikuchi et al. | |
| 2002/0139920 A1 | 10/2002 | Seibel et al. | |
| 2003/0218137 A1 | 11/2003 | Sendai | |
| 2005/0280766 A1 * | 12/2005 | Johnson et al. | 349/167 |

FOREIGN PATENT DOCUMENTS

EP    1 096 288    5/2001

OTHER PUBLICATIONS

International Search Report Issued for PCT/US2004/025164, dated Nov. 10, 2004.

* cited by examiner

*Primary Examiner*—Don Williams
(74) *Attorney, Agent, or Firm*—Fulbright & Jaworski L.L.P.

(57) ABSTRACT

A method for processing light energy is provided that includes receiving a plurality of photons reflected by an object and generating sensor data that is based a portion of the plurality of photons received. The sensor data is processed in order to generate processed sensor data. A segment of the processed sensor data that directly corresponds to the portion of the plurality of photons is displayed such that the segment may be viewed.

27 Claims, 2 Drawing Sheets

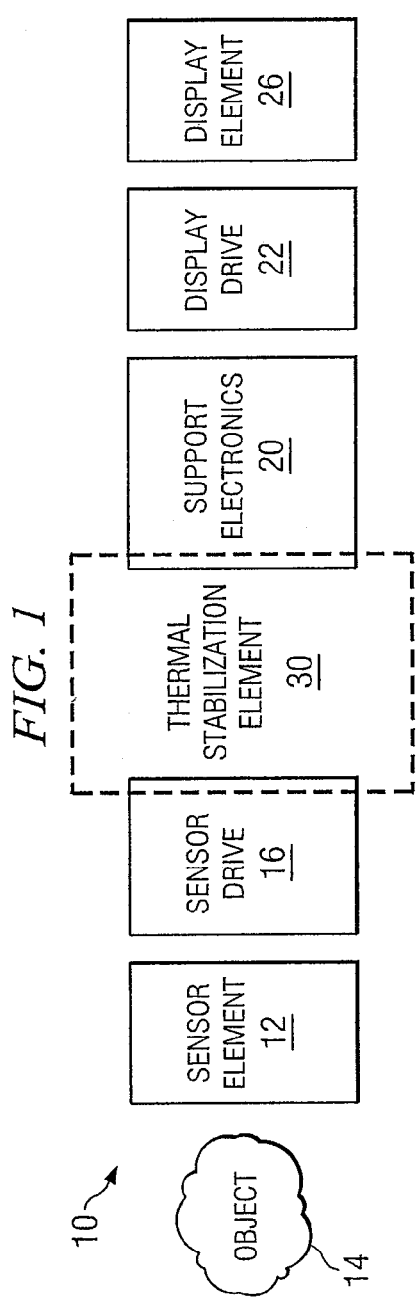
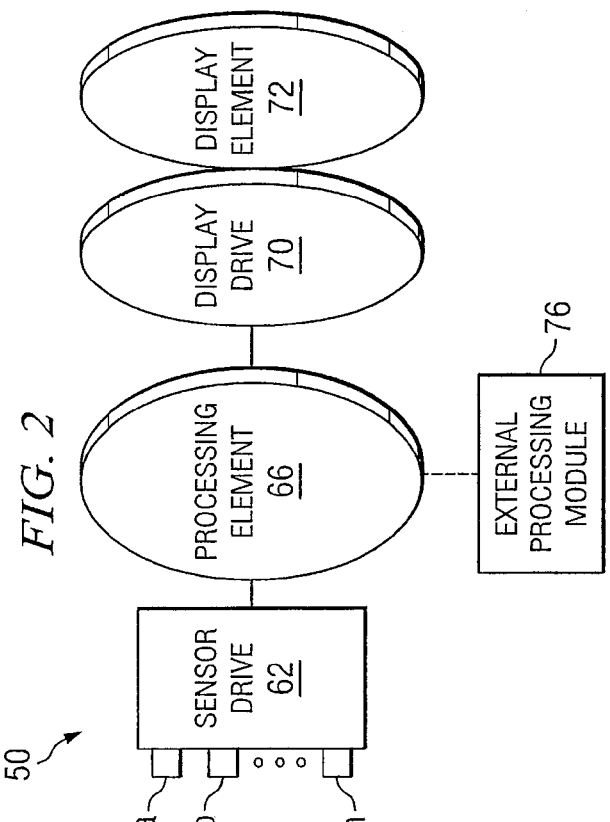
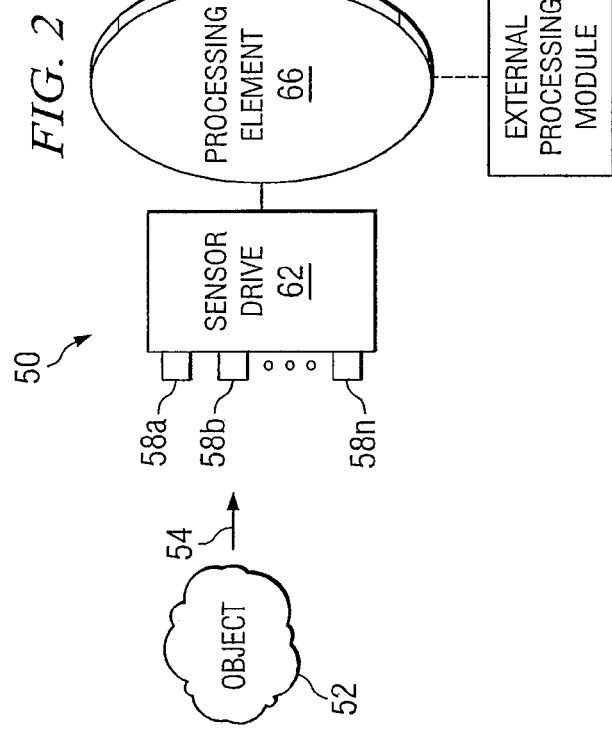

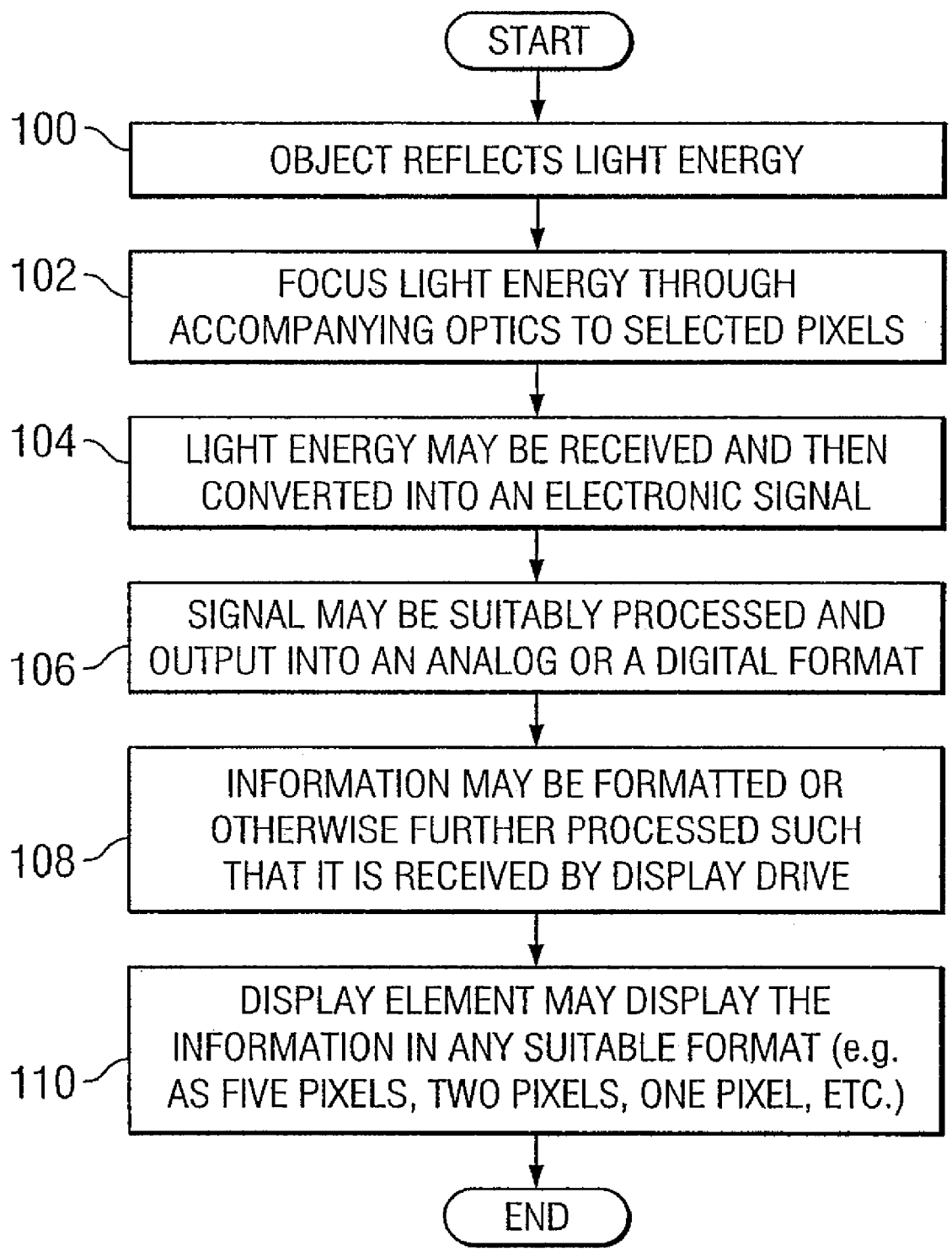

SYSTEM AND METHOD FOR PROCESSING AND DISPLAYING LIGHT ENERGY

CROSS-REFERENCE TO RELATED APPLICATIONS

This application is a continuation of U.S. patent application Ser. No. 10/636,940, entitled, "SYSTEM AND METHOD FOR PROCESSING AND DISPLAYING LIGHT ENERGY", filed Aug. 6, 2003, the disclosure of which is hereby incorporated by reference herein.

TECHNICAL FIELD OF THE INVENTION

This invention relates in general to the field of optical imaging and more particularly to a system and method for processing and displaying light energy.

BACKGROUND OF THE INVENTION

Optical imaging has become increasingly important in today's society. One area associated with optical imaging relates to the processing of light energy using various architectures, such as array devices, imaging components, or sensing elements for example. These architectures may generally include a light sensing configuration that generates a stream of sensor data. The stream of sensor data may then be processed and transmitted for display at a suitable next location. There are numerous problems and deficiencies associated with this scenario. For example, large amounts of processing time and power may be needed to execute this process. This may result in latency problems, bandwidth limitations, or an inhibition in resolution performance. In addition, systems capable of such operations may be cumbersome, as well as difficult to position and manipulate. Accordingly, the ability to provide an architecture capable of processing sensor data efficiently and effectively, while occupying minimal space, presents a significant problem for system designers in the field of optical imaging.

SUMMARY OF THE INVENTION

From the foregoing, it may be appreciated by those skilled in the art that a need has arisen for an improved sensor data processing approach that offers suitable processing of information in an optical imaging environment. In accordance with one embodiment of the present invention, a system and method for processing and displaying light energy are provided that substantially eliminate or greatly reduce disadvantages and problems associated with conventional sensor data acquisition and processing techniques.

According to one embodiment of the present invention, there is provided a method for processing and displaying light energy that includes receiving a plurality of photons reflected by an object and generating sensor data that is based on the plurality of photons received. The sensor data is processed in order to generate processed sensor data. A segment of the processed sensor data that directly corresponds to the plurality of photons is displayed such that the segment may be viewed.

Certain embodiments of the present invention may provide a number of technical advantages. For example, according to one embodiment of the present invention, a processing approach is provided that occupies minimal space. This is a result of the integration of several components that may be grown (or manufactured) individually, layer by layer, or that may be constructed as a single integral unit. The architecture provided by the teachings of the present invention allows a single integral unit to receive light radiation, to translate the light radiation into electronic data, and then to properly display the data in a suitable format at a suitable next location.

Another technical advantage associated with one embodiment of the present invention relates to the reduced power needed to operate the architecture. This is a result of the direct transmission of processed sensor data to a display pixel or to a small number of display pixels. For example, a sensing element may be used to receive incoming light and generate sensor data, which is digitally processed. The processed sensor data may then be directly transmitted to a specific display pixel. This configuration may eliminate processing power that would otherwise be needed to execute an imaging task covering a broad area of imaging information. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of one embodiment of a system for processing and displaying sensor data in an optical imaging environment;

FIG. 2 is a simplified block diagram of an example implementation of the system of FIG. 1; and FIG. 3 is a flowchart illustrating a series of example steps associated with a method for processing and displaying sensor data in an optical imaging environment.

DETAILED DESCRIPTION OF THE EXAMPLE EMBODIMENTS

FIG. 1 is a simplified block diagram of a system 10 for processing and displaying sensor data in an optical imaging environment. System 10 may be provided in any environment that seeks to display an optical image such that it may be adequately viewed at a next location. Alternatively, system 10 may be positioned in any suitable infrared environment that seeks to detect infrared energy in order to display light radiation levels associated with any suitable picture, pattern, image, object, or element. Thus, system 10 may be provided in any spectral range that provides some distinguishing characteristics (based on heat, energy, or any other infrared, light, or optical parameter) that may be used in order to properly display infrared data or information.

System 10 includes a sensor element 12 and a sensor drive 16. Sensor element 12 may collect sensor data based on a portion of photons being reflected by (or otherwise associated with) an object 14. The photons may be directed or communicated toward sensor element 12 such that light radiation may be properly received and suitably processed by sensor element 12. System 10 may also include support electronics 20, a display drive 22, and a display element 26. In addition, system 10 may optionally include a thermal stabilization element 30 that maintains a temperature gradient across one or more elements coupled thereto.

According to the teachings of one embodiment of the present invention, system 10 operates to provide an architecture that properly processes and displays infrared data received by sensor element 12. Sensor element 12 may detect incoming light and generate infrared data that is digitally processed. System 10 may digitally process the sensor data received from object 14 such that electronic values are correlated to radiation levels associated with object 14.

The processed sensor data may be transmitted to a specific location within display element 26. The processed sensor data may be transmitted directly to display element 26 or directly to a small number of display elements or pixels. This allows a minimal amount of processing power and time because each digital logic unit is operating to process the specific sensor data received from a single unit within sensor element 12. This allows spectrum shifting to be achieved by manipulating an input spectrum to a visible spectrum range using a single integral unit to focus optical energy onto a specific location.

System 10 may also execute sensor data processing on a pixel by pixel basis. Each pixel may be independent and self-supporting and, thereby, each pixel does not need information from its neighbors in order to achieve its intended function. Accordingly, the electronics needed to drive each pixel may be contained locally as each pixel achieves its own processing that may be used in displaying radiation levels associated with object 14 at display element 26. Intermediate processing layers may also be provided (as illustrated in FIG. 1) in order to assist in this operation or to execute more advanced processing operations. For example, analog and digital processing may be effectuated in order to achieve pixel by pixel processing and display.

Sensor element 12 is a light radiation sensing device that operates to receive photons or light radiation reflecting by object 14. Sensor element 12 may alternatively be any suitable sensing device, component, tool, or element operable to collect or otherwise receive (actively or passively) any data associated with light energy, heat, or radiation levels. For example, sensor element 12 may comprise a pixel or multiple pixels used in the reception of infrared data that serves as a basis for displaying object 14. Sensor element 12 may be coupled to sensor drive 16 and share one or more processing operations with sensor drive 16. Each of the pixels may communicate with each other in order to reach a consensus concerning uniformity corrections. This operation may be accomplished in cooperation with support electronics 20.

Sensor drive 16 is coupled to support electronics 20 directly or via thermal stabilization element 30 and operates to process sensor data received from sensor element 12. Sensor drive 16 may include sense amplifiers and/or equalizers operable to effectuate this task. Sensor drive 16 may properly receive sensor data and process the information such that it is communicated to support electronics 20 to be formatted or otherwise further processed for display. One or more of the operations of sensor drive 16 may be incorporated into the architecture of sensor element 12 or support electronics 20, or alternatively any one or more of these elements may be combined to form a single functional unit having the capabilities as described above.

Support electronics 20 includes circuitry (inclusive of any suitable hardware or software where appropriate) that operates to facilitate the coupling between one or more sensing elements (e.g. pixels included within sensor element 12) and display element 26. Support electronics 20 is coupled to display drive 22. Support electronics 20 may also include a memory element used to execute calibration operations, to eliminate non-uniformity characteristics, or to effectuate any other suitable operations in accordance with particular needs. Support electronics 20 may include elements used for image processing of the sensor data received from sensor drive 16. The image processing may include analog or digital processing and inclusive of distributed circuitry processing where appropriate. The capabilities of support electronics 20 may also be inclusive of more sophisticated non-linear analog processing operations. Support electronics 20 may be a dedicated configuration for a single pixel column or, alternatively, configured to be dedicated for an entire array of elements where appropriate.

Display drive 22 and display element 26 cooperate in order to display information based on light radiation associated with object 14. Display drive 22 may receive information that is suitably processed by support electronics 20 and communicate this information to display element 26 such that it may be viewed. Alternatively, display element 26 may be replaced with additional processing elements or such processing elements may be positioned between display drive 22 and display element 26 in accordance with particular needs. Additionally, display drive 22 and display element 26 may be provided as a single integral element, where appropriate, that operates to receive a selected amount of processed sensor data and to display that information appropriately. Display element 26 may be associated with organic light emitting diode (OLED), liquid crystal on silicon (LCOS), or reflective liquid crystal display (LCD) technologies. Alternatively, display element 26 may be associated with any other suitable technology operable to properly display processed infrared information.

In an alternative embodiment of the present invention, thermal stabilization element 30 may be provided to system 10. In certain applications, such as when implementing a configuration with vanadium oxide, longwave elements, or other appropriate architectures, cooling may be needed in order to balance the temperature of the pixels and to produce a uniform temperature gradient across sensor drive 16. Accordingly, thermal stabilization element 30 may be provided to offer a layer that stabilizes or cools infrared sensors (or other suitable visible sensors). Thermal stabilization element 30 may also provide noise reduction capabilities for a corresponding device or component.

The elements of system 10 may be implemented in any suitable hardware, software, object, device, component, or element. In one embodiment of the present invention, system 10 may be grown layer by layer using a number of suitable manufacturing processes. Alternatively, system 10 may be grown in different layers and bonded together in some integration phase. Additionally, system 10 may be grown as a single element using appropriate semiconductor processing techniques. Moreover, any one of more of the elements of FIG. 1 may be combined into one or more integral pieces having the functions and capabilities used in the processing and the display of light energy associated with object 14.

A significant reduction in latency may be achieved as a result of the architecture of system 10. 'Latency' generally refers to the time interval that is necessary for a photon, which impinges on the input of sensor element 12, to propagate through the associated configuration, to be suitably processed, and then to be adequately displayed at display element 26. In particular, latency may create significant problems for overlay fusion devices and image intensifiers, to which minimal latency periods are critical. The architecture of the present invention allows latency values to be minimized to the nano-second range. Additionally, latency issues may be addressed while achieving a full-field integration rather than a rolling integration. For example, such a full-field application may involve implementing system 10 in conjunction with snapshots or output video where an array element may be placed in a layer that is actually performing the digital correction or digital readout functions.

System 10 may also achieve enhanced resolution characteristics. The enhanced resolution is due to one or more bandwidth limiting parameters being eliminated from the corresponding architecture of system 10. Thus, because of the pixel by pixel architecture of system 10, bandwidth allocations may be optimized, which allows for a higher resolution of object 14 to be displayed at display element 26.

It should also be appreciated that numerous other systems may be involved in the operation of the elements of FIG. 1. A complete system or multiple subsystems (inclusive of additional electronics and appropriate interfaces) may be provided in conjunction with these elements in order to effectuate suitable processing of infrared energy associated with object 14. Additional elements may also be added to system 10 in order to properly format the sensor data in a manner that allows suitable viewing by an end user. Additional electronics may also be involved in the decoding of information being provided to system 10.

In operation of an example embodiment, system 10 may use pixel by pixel processing in order to provide a single pass-through device for displaying infrared data. Each given pixel provided in sensor element 12 may include, for example, a 1:1 direct coupling or connection to a given output or to a set of designated locations within display element 26. Accordingly, one pixel on the output may be directly correlated to one pixel on the input of system 10. This configuration may avoid problems associated with an array of pixels. System 10 allows data to be formatted in a way that allows an end user to view or to suitably process the incoming sensor data on a pixel by pixel basis.

System 10 may offer a processing approach that occupies minimal space. This may be the result of the integration of several components that may be grown or manufactured individually (layer by layer) or that may be constructed as a single integral unit. The architecture provided allows a single integral unit to receive light radiation, to translate the light radiation into electronic data, and then to properly display the data in a suitable format at a next location.

FIG. 2 is a simplified block diagram of an example implementation of system 10. FIG. 2 illustrates an architecture 50 that may be provided within any tool, device, component, element, or object that receives infrared energy and seeks to display that energy for viewing by an end user. In general, an example object 52 may project, direct, reflect or otherwise be associated with photons, radiation, or light energy in a direction as indicated by an arrow 54. The light energy may be received by a number of pixels 58a-n that are coupled to sensor drive 62 of architecture 50. Architecture 50 also includes a processing element 66 that is coupled to an optional external processing module 76. A display drive 70 and a display element 72 may also be provided to architecture 50 in order to receive sensor data and properly display the sensor data such that it may be viewed.

Pixels 58a-n are sensor elements that may be provided in order to detect or otherwise receive photons, radiation, or light energy to be correlated to analog signals reflecting infrared energy. Pixels 58a-n may comprise any suitable material such as lead (Pb) salt or vanadium oxide for example. Pixels 58a-n may receive light energy and properly process, format, or otherwise direct the sensor data to sensor drive 62. In an example embodiment, sensor drive 62 executes signal conditioning for each pixel 58a-n. Sensor drive 62 receives the sensor data and communicates the sensor data to processing element 66.

Processing element 66 is an object used to receive and properly process sensor data based on photons reflected by object 52. In an example embodiment, processing element 66 may include a complimentary metal oxide semiconductor (CMOS) layer operable to execute designated processing on sensor data received from sensor drive 62. Processing element 66 may include memory cells that depend on external stimuli for controlling system temperature parameters that may be properly varied. This may allow each pixel 58a-n to be adjusted based on a selected calibration procedure. Additionally, a thermal stabilization element may be provided in conjunction with processing element 66 such that a consistent temperature gradient is maintained across the interface between sensor drive 62 and processing element 66. The thermal stabilization element may behave similar to thermal stabilization element 30 described above with reference to FIG. 1.

Processing element 66 may execute analog or digital processing (or any combination thereof) in order to suitably process sensor data. In addition, processing element 66 may be inclusive of any suitable device operable to provide or to assist in the processing of sensor data. For example, processing element 66 may include a field programmable gate array (FPGA) operable to program non-uniformity corrections. In addition, processing element 66 may include other suitable processing elements such as an erasable programmable read-only memory (EPROM), an electrically erasable read-only memory (EEROM), an application specific integrated circuit (ASIC), a microprocessor, or any other integrated circuit or processing element operable to provide some processing or manipulation of sensor data received from sensor drive 62. These elements may also be provided external to processing element 66, for example, within external processing module 76. Processing element 66 may also execute distributed computing or be confined to pixel by pixel configurations. Processing element 66 may also execute situational or dynamic programming, allowing processing to be immediately impacted in accordance with current system needs.

Processing element 66 may also receive one or more instructions from external processing module 76. External processing module 76 may also be inclusive of any of the elements described above with reference to processing element 66. External processing module 76 may communicate with processing element 66 in order to offer an external programming agent in providing processing tasks to be executed by processing element 66. Alternatively, any of the operations or capabilities of processing element 66 may be provided in external processing module 76 using any suitable combination such that these elements collectively process incoming sensor data appropriately.

Display drive 70 and display element 72 operate in a similar fashion as described above with reference to FIG. 1 and display drive 22 and display element 26. In an example embodiment, display drive 70 may assist in the processing of information received from processing element 66 such that the information is properly formatted and suitably directed to display element 72. Display element 72 is an object capable of displaying infrared information such that it may be properly viewed by an end user.

FIG. 3 is a simplified flowchart illustrating a series of example steps associated with a method for processing and displaying infrared energy. FIG. 3 is described with reference to FIG. 2 in order to identify example components that may potentially be used to effectuate the operations being described. The description provided has been offered for purposes of example and teaching only and should not be construed to limit the plethora of other environments, configurations, architectures, and systems that may benefit from the teachings of the present invention.

The method begins at step 100 where object 52 is emitting light energy (or reflecting photons) as indicated by arrow 54. The light energy may be properly focused through accompanying optics to a selected one or more of pixels 58a-n at step 102. The optics may be included in any suitable device, component, tool, element, or object provided in conjunction with architecture 50 or system 10. Optics may operate to focus a 'hot spot' associated with object 52 onto selected pixels 58a-n. Pixels 58a-n may execute the delivery of information such that sense amplifiers and equalizers are invoked at sensor drive 62 in order to properly communicate the information in evaluating the level of light energy associated with object 52. Thus, an analog or a digital value may be received that indicates, on some selected or designated range, what is being seen. The optical radiation may be received and then converted into an electronic signal at step 104. At step 106, the signal may be suitably processed and output into an analog or a digital format. Such an operation may be achieved by sensor drive 62 in cooperation with processing element 66 (and optionally external processing module 76).

At step 108, the information may be formatted or otherwise further processed such that it is received by display drive 70 and properly displayed by display element 72. Display element 72 may display the information in any suitable format at step 110. For example, display element 72 may display this information using any suitable number of pixels. Display element 72 may also display this information using a one to one correlation.

Depending on the sensing element being implemented, uniformity corrections may also be executed. Memory cells or an analog device may be used that maps sensor data to a given pixel, providing some offset or gain (for a given temperature or for an input dynamic range) in order to execute some non-uniformity correction. Additionally, display drive 70 may include electronics modified to the calibration for display element 72, which allows for the correction of bad pixels or non-uniformities. Display drive 70 may then output this data to be displayed by display element 72. Where appropriate, display element 72 may also include an analog to digital conversion for providing a digital output for viewing by an end user.

Some of the steps illustrated in FIG. 3 may be changed or deleted where appropriate and additional steps may also be added to the flowchart. These changes may be based on specific infrared system architectures or particular communications arrangements or configurations and do not depart from the scope or the teachings of the present invention.

Although the present invention has been described in detail with reference to particular embodiments, it should be understood that various other changes, substitutions, and alterations may be made hereto without departing from the spirit and scope of the present invention. For example, although the present invention has been described with reference to a particular configuration, the present invention may be used in numerous other applications that seek to identify images or elements based on infrared energy. For example, system 10 may be used in conjunction with a charge-coupled device (CCD) detector, or in inspection applications that seek to identify designated pieces of information or data segments. Additionally, system 10 has applications in medical devices where images are deciphered and displayed based on their corresponding light energy levels. Moreover, system 10 may be applied to the sorting or qualifying of products. For example, system 10 may be used in conjunction with mail-sorting applications where an address (or any other suitable piece of information) is sought to be identified.

In addition, although system 10 has been described as being constructed in a designated manner, both system 10 and architecture 50 may be constructed or composed in any suitable fashion. Architecture 50 and system 10 may be constructed using any appropriate semiconductor techniques. For example, system 10 and architecture 50 may be grown using semiconductor processes layer by layer or as an entire single integral unit. In cases where system 10 or architecture 50 are grown layer by layer, these elements may be suitably bonded and then positioned in the selected environment. In addition, system 10 and architecture 50 may be constructed and then provided in any suitable device, element, object, component, or infrared tool that seeks to detect light energy and properly display that information using some display element. Moreover, numerous other components may be provided in conjunction with these elements in order to enhance the processing or display characteristics of the sensor data being collected by sensor element 12 or pixels 58a-n. Additionally, various other enhancements or modifications may be provided to any of these elements, such as sensor element 12 or pixels 58a-n, in order to increase the sophistication or the capabilities of the corresponding elements.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for processing light energy, comprising:
a sensor element included within an array of sensor elements and operable to receive a portion of the plurality of photons reflected by an object;
a sensor drive coupled to the sensor element and correlating directly thereto, the sensor drive and the sensor element cooperating in order to generate sensor data that is based on the portion of the plurality of photons received by the sensor element;
a support electronics element coupled to the sensor drive and correlating directly thereto, the support electronics being operable to process the sensor data in order to generate processed sensor data, wherein said sensor element, said sensor drive, and said support electronics are combined to form a single functional unit; and
a display element coupled to the support electronics and correlating directly thereto, the display element being operable to receive the processed sensor data from the support electronics element, the display element being further operable to display a segment of the processed sensor data that directly corresponds to the portion of the plurality of photons;
wherein the sensor element includes one or more pixels, and wherein each of the pixels have a one-to-one direct coupling path to one or more output segments included in the display element.

2. The apparatus of claim 1 further comprising:
a thermal stabilization element coupled to the sensor drive and operable to provide a temperature gradient consistency associated with the sensor drive.

3. The apparatus of claim 1, further comprising:
a display drive coupled to the support electronics element and the display element, the display drive being operable to format the processed sensor data such that it may be displayed by the display element.

4. The apparatus of claim 1, wherein the support electronics element is further operable to execute a selected one of digital and analog processing on the sensor data in order to generate the processed sensor data.

5. The apparatus of claim 1, wherein the sensor drive includes one or more sense amplifiers and one or more equalizers, each of which are operable to manipulate the plurality of photons in order to generate the sensor data.

6. The apparatus of claim 1, wherein the display element is a selected one of a group consisting of:
    an organic light emitting diode (OLED) display; a liquid crystal on silicon (LCOS) display; and a reflective liquid crystal display (LCD).

7. The apparatus of claim 1, wherein the support electronics element is operable to execute a selected one of a group of operations consisting of:
    formatting the sensor data;
    correcting non-uniformity characteristics in the sensor data;
    executing window manipulations for the sensor data; and
    decoding the sensor data.

8. The apparatus of claim 1, further comprising:
    an external processing module coupled to the support electronics element and operable to provide processing instructions to the support electronics element in order to designate a manner in which the sensor data is processed in order to generate the processed sensor data.

9. The apparatus of claim 1, wherein said apparatus is included in a mail sorting device.

10. The apparatus of claim 1, operable to receive infrared photons from said object and to generate a display of said object based upon said received infrared photons.

11. The apparatus of claim 1, wherein one or more of the pixels communicate with each other in order to facilitate uniformity corrections associated with the plurality of photons, the uniformity corrections being executed in cooperation with the support electronics element.

12. A method for processing light energy, comprising:
    receiving a portion of a plurality of photons reflected by an object with a sensor element included in array of sensor elements;
    generating sensor data that is based on the portion of the plurality of photons received;
    processing the sensor data in order to generate processed sensor data; and
    displaying a segment of the processed sensor data that directly corresponds to the portion of the plurality of photons such that the segment may be viewed on a display element, wherein the sensor element includes one or more pixels, and wherein each of the pixels have a one-to-one direct coupling path to one or more output segments included in the display element, wherein said receiving, generating, processing, and displaying are performed by a single integral unit.

13. The method of claim 12, further comprising:
    formatting the processed sensor data such that the segment may be displayed.

14. The method of claim 12, further comprising:
    executing a selected one of digital and analog processing on the sensor data in order to generate the processed sensor data.

15. The method of claim 12, further comprising:
    communicating processing instructions in order to designate a manner in which the sensor data is processed in order to generate the processed sensor data.

16. The method of claim 12, further comprising:
    executing uniformity corrections associated with one or more of the plurality of photons in order to manipulate the sensor data before it is processed.

17. The method of claim 12, further comprising:
    providing a temperature gradient consistency associated with the sensor drive.

18. The method of claim 12 further comprising:
    identifying a piece of information on a product after said displaying.

19. The method of claim 12, wherein said photons reflected by an object comprise infrared photons, and wherein said processed sensor data comprises infrared data.

20. A system for processing light energy, comprising:
    means for receiving a portion of a plurality of photons reflected by an object;
    means for generating sensor data that is based on the portion of the plurality of photons received;
    means for processing the sensor data in order to generate processed sensor data; and
    means for displaying a segment of the processed sensor data that directly corresponds to the portion of the plurality of photons such that the segment may be viewed, wherein the means for receiving includes one or more pixels, and wherein each of the pixels have a one-to-one direct coupling path to one or more output segments included in the means for displaying, wherein said receiving means, generating means, processing means, and displaying means are included in a single integral unit.

21. The system of claim 20, further comprising:
    means for formatting the processed sensor data such that the segment may be displayed.

22. The system of claim 20, further comprising:
    means for executing a selected one of digital and analog processing on the sensor data in order to generate the processed sensor data.

23. The system of claim 20, further comprising:
    means for communicating processing instructions in order to designate a manner in which the sensor data is processed in order to generate the processed sensor data.

24. The system of claim 20, further comprising:
    means for executing uniformity corrections associated with one or more of the plurality of photons in order to manipulate the sensor data before it is processed.

25. The system of claim 20, further comprising:
    means for providing a temperature gradient consistency associated with the receiving means.

26. The system of claim 20, wherein said photons reflected by an object comprise infrared photons, and wherein said processed sensor data comprises infrared data.

27. The system of claim 20, further comprising:
    means for identifying a piece of information on a product after said displaying.

* * * * *